US005573832A

United States Patent [19]

Frati

[11] Patent Number: 5,573,832

[45] Date of Patent: Nov. 12, 1996

[54] METHOD FOR PRODUCING COATED WOOD-BASED PANELS WITH ROUNDED EDGES AND PANELS OBTAINED THEREBY

[75] Inventor: Dante Frati, Mantova, Italy

[73] Assignee: Bipan S.E.A., Bicinicco Udine, Italy

[21] Appl. No.: 538,129

[22] Filed: Oct. 2, 1995

[30] Foreign Application Priority Data

Sep. 30, 1994 [IT] Italy ................................ MI94A2005

[51] Int. Cl.$^6$ ........................................................ B32B 9/00

[52] U.S. Cl. ............................ 428/192; 428/15; 428/290; 428/375; 428/431; 428/443; 428/481; 428/482; 428/535; 428/537.7; 428/703; 523/518; 54/591; 427/533; 204/157.63

[58] Field of Search .................................... 428/375, 535, 428/537.7, 290, 482, 15, 481, 703, 431, 443; 523/518, 500; 524/591; 427/44, 36, 38; 204/159.15, 159.19, 158.16

[56] References Cited

U.S. PATENT DOCUMENTS

| | | | |
|---|---|---|---|
| 3,917,522 | 11/1975 | Vargin et al. | 204/159.15 |
| 4,170,663 | 10/1979 | Hahn et al. | 427/44 |
| 4,227,979 | 10/1980 | Humke et al. | 204/159.16 |
| 4,239,866 | 12/1980 | Reitel et al. | 525/440 |
| 4,265,723 | 5/1981 | Hesse et al. | 204/159.23 |
| 4,501,635 | 2/1985 | Siry et al. | 156/273.3 |
| 5,075,370 | 12/1991 | Kubitza et al. | 524/591 |
| 5,460,857 | 10/1995 | Schanck | 427/494 |
| 5,470,897 | 11/1995 | Meixner et al. | 523/518 |

*Primary Examiner*—Patrick Ryan
*Assistant Examiner*—Abraham Bahta
*Attorney, Agent, or Firm*—Steinberg, Raskin & Davidson P.C.

[57] ABSTRACT

A method for producing coated wood-based panels with rounded edge from a starting panel coated on at least one of its two sides, and which is subjected to a preforming or direct postforming process. The starting panel is coated using coatings based on unsaturated resins of the type curable by ionizing radiation.

16 Claims, 1 Drawing Sheet

METHOD FOR PRODUCING COATED WOOD-BASED PANELS WITH ROUNDED EDGES AND PANELS OBTAINED THEREBY

FIELD OF THE INVENTION

This invention relates generally to a method for producing wood-based panels coated with coatings based on unsaturated resins of the type curable by ionizing radiation, the panels produced thereby, and the use of such coatings for producing such panels.

BACKGROUND OF THE INVENTION

The furniture manufacturing industry uses as starting material, a large quantity of wood-based panels formed by various industrial methods which enable panels to be obtained satisfying various market requirements. As is well known to the expert in the art, the panels formed in this manner fall substantially into two categories, namely so-called chipboard panels and so-called fiberboard panels, which are also known by the symbol MDF.

Chipboard panels are composed of particles of wood and/or other ligno-cellulose materials, agglomerated by suitable thermosetting resins. These particles are obtained by initial transformation of the raw material into chips of well defined size and thickness which are subdivided to a greater or lesser fineness depending on the compactness of the panel or panel layer to be obtained.

Fiberboard panels are formed from fibers of wood or other lignocellulose materials obtained by the mechanical grinding of the raw material. The procedure is implemented at high temperatures in a pressurized steam environment. As is known to the expert in the art, a medium density fiberboard panel (known in this field as MDF) is formed under dry conditions, with drying of the fibers before forming the so-called "mattress", which is then pressed and treated with thermosetting resins, in the absence of water and under reduced pressure.

Both chipboard panels and fiberboard panels have assumed a fundamental importance in the furniture manufacturing industry because of their workability, the degree of finish obtainable therefrom and their high performance/cost ratio.

The finishing processes (the so-called "enhancement") to which such panels are subjected to give them the characteristics of the final product can be divided into various categories:

a) Enhancement with decorative paper. This process consists of covering the panel with paper which can be colored, or printed with various decorative motifs. This is done by previously impregnating the panel surface with thermosetting resins and then gluing the paper under hot conditions. The paper can also form the base for subsequent coating (discussed hereinafter). A particular type of paper which enables complete uniformity of the panel surface to be achieved is known as "Kraft". This paper is formed starting with the normal paper for such uses, which is then covered with melamine resin serving as a base for a phenolic resin. The paper obtained is usefully used when high surface mechanical characteristics of the product are required.

b) Enhancement with thermoplastic film. A thin film of thermoplastic material, for example, polyvinyl chloride (PVC) is pressed onto the panel, over which glue has been previously spread. By using pressing plates pressed against the surface of the panel covered with the film, special surface effects are achieved which cannot be achieved with other enhancement methods. Moreover, the high foldability of such a film means that the curvatures of the panel ends can easily be followed by the methods known to the expert in the art, and which are briefly described hereinafter.

c) Enhancement by applying precomposed cut sheets (veneering). Thin layers or sheets of wood of various types and various colors are formed by special sophisticated manufacturing techniques. These sheets are glued to the untreated panel to obtain a product having many uses in furniture components.

d) Enhancement by coating. This is a technique which has attained very high quality and is much used in the furniture industry to form panels with a single color surface or covered with transparent coatings. The panel surface first receives an application of a pore sealant (having a predetermined density according to whether the panel is of chipboard or of fiberboard), followed by a levelling coating to smooth the surface, and finally two or more layers of finishing coating to obtain the desired color effect.

The type of enhancement described under points a) and c) above can be completed with a transparent finish obtained by applying a transparent base coating to smooth the surface, followed by one or more layers of finishing coating to give the panel the desired gloss effect. These coatings are applied in various ways, depending on the form of surface to be coated. The method of application mostly used is spraying by manual spray guns or by using robotized equipment which also enables the curved ends of the panel to be coated. Roller spreading or curtain coating machines are known which, although allowing mass production, only enable the flat surface of a series of panels to be coated (not their ends). The coating thicknesses to be applied can vary within a very wide range, depending on the type of panel to be coated and the coating product used.

The coating products conventionally used for coating the aforedescribed panels can be divided into the following categories:

1. Nitrocellulose or acrylic-based single-component coatings which dry at ambient temperature by evaporation of the solvent (organic or aqueous);
2. Two-component coatings of acid catalysis alkyd or polyurethane type, which dry at ambient temperature or in hot air (40°–50° C.) by chemical reaction between the functional groups present in the resins;
3. Unsaturated polyester-based coatings containing monostyrene as the reactive diluent (using organic peroxides as catalysts) in the presence of organic salts as activants, which dry at ambient temperature or in hot air (40°–50° C.) by radical polymerization of the unsaturated double bonds present in the resin and in the reactive diluent; and
4. Coatings based on unsaturated polyesters mixed with acrylic unsaturated functionality resins of polyester, polyether, urethane or epoxy type, which when in the presence of particular photosensitive compounds dry by radical polymerization activated by electromagnetic radiation having a wavelength of between 240 and 420 nanometers (ultraviolet UV spectrum).

The use of coatings of points 1 and 2 above has the drawback that they contain organic solvents and hence contrast with the modern industrial tendency of not using pollutant products, but instead using those with an extremely low or zero content of volatile organic substances (VOS).

Although the coatings of point 3 above have a significantly reduced VOS content, they contain a harmful reactive diluent of low vapor pressure (styrene). They are also unsuitable for automated coating cycles because of their relatively low polymerization rate.

The coatings of point 4 are currently the industrially most advanced of the traditional coatings, in that they can be used in automated production, although at a production rate which is not yet high. This is due to the fact that the dangerous reactive diluent can be limited by replacing it with other diluents of the acrylic type (i.e., containing an unsaturation derived from acrylic acid) which have a much higher vapor pressure.

As is known to the expert of the art, photoactive curing allows rapid drying of these coatings is of a transparent type, i.e., formed from components which do not act as a filter against electromagnetic radiation. However, if organic and/or inorganic pigments are introduced in order to obtain colored coatings, curing is strongly retarded. Hence the quantity of pigment has had to be limited to a low percentage (not exceeding about 10% by weight), with the result that these coatings have a limited covering power. To obviate this drawback, multiple layers of such coatings have recently been used so as to divide the pigment between them and reduce their screening effect, or alternatively coatings of the types 1, 2 or 3 have been combined with those of type 4. In the first case, a multi-layer pigmented covering is achieved having a large total thickness and low reactivity towards UV. This means that in practice resins with a high density of reactive groups have to be used, with the result that the multi-layer coating is fairly rigid both intrinsically and because of its large thickness. Up to the present time, this has precluded the use of pigmented coatings of type 4 for enhancing panels with rounded edges by the so-called preforming or direct postforming process which require the already cured coating layer to be bent to cause it to adhere to the curved end.

In the case of the combination of a type 1, 2 or 3 coating with a type 4 coating, the already described ecological and economical drawbacks apply.

For a better understanding of the ensuing description, it is considered appropriate to briefly describe the methods for completing panel enhancement on their ends, these being substantially of two types:

I. Manual methods.

These methods are used at the craftsman level and consist of manually covering the panel end with strips of the most varied materials such as wood, plastic and in particular PVC (polyvinylchloride) or ABS (acrylonitrile-butadiene-styrene copolymer), hide, glass or metal. This enables panels to be obtained having ends which satisfy the most varied decorative requirements.

II. Industrial methods.

These methods are implemented completely automatically. Their greatest limit is that for end enhancement they enable only a limited number of materials to be used, the thickness of which is limited to a narrow range, as is also the end height. In particular, for PVC and ABS ends the thickness must be between 0.2 and 0.3 mm, for melamine laminate ends the thickness must be between 0.2 and 0.8 mm, and for wood strips the thickness must be between 0.2 and 25.0 mm. These methods consist of "adding", i.e., gluing, along the panel ends a strip of one of the aforelisted materials, possibly after previously rounding the panel end by soft-forming. A further finish can be applied to the end obtained in this manner, for example a coating, if a wooden strip has been used.

The requirement for qualitatively and aesthetically improving the finished edged panel has led to the conception of an industrial process known as postforming, which achieves the important result of obtaining a panel of uniform appearance (i.e., the end has the same appearance as the rest of the panel), thereby avoiding anti-aesthetic discontinuities which can also represent paths for the penetration of moisture from the outside, compromising the final product even a short time after its manufacture.

For a better understanding of the present invention, a brief description will be given of the stages involved in postforming. Reference will be made to FIGS. 1–5 of the accompanying drawings, which show a partial cross-section through a rounded-end panel during the various stages of implementation of this enhancement procedure. Specifically, FIG. 1 shows the right end portion of an untreated chipboard or fiberboard panel 10 to be enhanced, the relative end 12 having a semicircular profile. FIG. 2 shows the same panel 10, to the two faces of which there has been applied a respective sheet (14 and 15) consisting of paper or a film of thermoplastic material (such as PVC). As can be seen, the sheet 14 applied to the upper face projects beyond the end of the panel 10 for a precise predetermined distance (its projecting edge possibly being suitably ground by an appropriate tool 16, as shown in FIG. 3), whereas a sheet 18 applied to the lower face of the panel 10 has only a minimum projection. As shown in FIG. 4, a tool (represented very schematically in this figure and indicated by the reference numeral 20) is used to remove from the lower sheet 18 an end strip of suitable length such that when the projecting part of the upper sheet 14 is bent against and into contact with the rounded end 12 of the panel 10 while being simultaneously hot-glued, this entire end 12 becomes covered by the upper sheet 14 (as can be seen in FIG. 5). Only a joining line 22 which separates the upper sheet 14 bent around end 12 from the lower sheet 18 remains visible in the finished panel 10'.

An improvement on the aforedescribed postforming process is the so-called preforming process, also known as direct postforming, which compared with the preceding has considerable production and cost advantages. In this respect, it starts with a standard finished panel, i.e., already enhanced but only on its faces. This hence dispenses with one specific panel enhancement stage, as instead is required in the preceding case.

A brief description will be given of a known preforming process with reference to FIGS. 6–14 of the accompanying drawings, which show a partial cross-section through a standard panel. This panel is shown during the successive stages of implementation of the process, its right end being flat, vertical and not enhanced. Specifically, FIG. 6 shows a panel 30, already enhanced by the application on each of its two faces of a sheet, 34 and 38, respectively, of decorative paper (Kraft or melamine type) or a film of thermoplastic material. The same figure also shows the formation in the upper surface of the panel, at a suitable precalculated distance from an end 32 and by means of a suitable cutting tool 36, of an incision extending perpendicular to the plane of the sheet and having a depth greater than the thickness of the upper sheet 34. Using a milling tool 40, both that portion of the upper sheet between the incision and the panel end 32 and a large part of the underlying panel portion are then removed (FIG. 7). Using another suitable tool 46, the remaining lower portion of the panel is then also removed, practically as far as the lower sheet 38 (FIG. 8) whereby the lower sheet 38 consequently projects a certain distance from the panel 30. The panel now has a new side 32' (which need not be vertical, but can be inclined to the panel faces) to the rear of the original side 32. Using a further suitable tool 48, the lower edge of the side 32' is then rounded, to obtain a partially curved side 32" (FIG. 9). This rounding can have a maximum radius of curvature equal to one half the panel thickness (it is smaller in the case illustrated). Using a further tool 49, an incision is made between the lower end of the rounding and the lower sheet 38, to obtain a side 32''' shaped as in FIG. 10. If the projecting lower sheet portion is now bent upwards and glued against the side 32''', the panel 30 of FIG. 11 is obtained, in which the only discontinuity is the joining line 42 between the sheet 34 and the sheet 38.

If a panel is required with an end having both edges rounded, the stage shown in FIG. 10 is followed by the further stages shown in FIGS. 12–14, comprising removing a further end portion of the sheet 34 using a suitable tool 50 (FIG. 12), then rounding the upper edge of the panel 30 using a further tool 52 to obtain the end 32"" with double rounding, then grinding the edge of the lower sheet 38 using a suitable tool 54 (FIG. 13), and finally bending the projecting portion of this lower sheet 38 upwards and hot-gluing it against the end 32"" to obtain the finished panel 30" of FIG. 14.

Obviously, if a rounded end such as that shown in FIGS. 1–5 is required, the radius of curvature with which the two edges of the panel are rounded is equal to one half the thickness of the panel 30.

A machine normally used for implementing the afore-described process in a completely automatic manner is that manufactured by the German firm Homag Maschinenbau AG, carrying the symbol VFL.

In both the described postforming process (FIGS. 1–5) and preforming or direct postforming process (FIGS. 6–14), the covering sheet which is bent and glued to the curved end is subjected to high-intensity thermomechanical stressing (a temperature of up to 200°–250° C. is used), because of which the sheet used must have particular structural characteristics to obtain a homogeneous result without splitting or color changes. Panels covered with melamine sheet have proved suitable for the purpose, whereas coated panels using traditional coatings and processes have demonstrated problems in resisting the mechanical stresses to which they are subjected during the process, with consequent microscopic or even macroscopic fractures arising. For these reasons, up to the present time it has not be possible to produce rounded-end panels coated by an automated industrial process, such panels being necessarily produced by the afore-described manual craftsman method.

OBJECTS AND SUMMARY OF THE INVENTION

Accordingly, it is an object of the present invention to overcome the prior art problems by providing a method for industrially producing coated rounded-edge or curved-end panels.

A further object of the present invention is to obtain a coated panel of the type starting with a standard coated panel, i.e., coated only on its two faces.

These objects are attained by a method for producing coated wood-based panels with rounded edges according to the present invention, in which the starting panel, coated on at least one of its two sides, is subjected to a preforming or direct postforming process, characterized in that the starting panel is coated using coatings based on unsaturated resins of the type curable by ionizing radiation (a curing method known as electron beam curing, EBC). In this respect, it has been surprisingly found that this type of coating enables a film to be obtained which is easily bendable at the working temperature of the preforming or direct postforming machines, this film preserving on termination of the method the desired mechanical resistance to rubbing, chemical resistance to deterioration with time, and the aesthetic quality of invariability of the initial color.

Conveniently, the unsaturated resin-based coatings are of the acrylic and/or methacrylic and/or vinyl type, which enable a sufficiently high degree of cross-linking to be obtained to ensure resistance to chemical attack, in accordance with the standards of the furniture panel sector. They must at the same time maintain film flexibility, in addition to not undergoing curing inhibition by those organic and inorganic components present in the coating which are used as dies or solid fillers. These coatings are moreover free from inert solvents.

Three examples of unsaturated resins of the aforesaid type are given, these examples having been proven to be particularly convenient in implementing the method of the present invention:

1. Unsaturated polyester resins dissolved in vinyl or acrylic monomers. These resins consist of mixtures of polycarboxylic acids containing an unsaturated ethylenic double bond (maleic acid, fumaric acid, mesaconic acid, itaconic acid) and/or their corresponding anhydrides, reacted with polyfunctional alcohols (for example ethylene, diethylene, propylene, dipropylene or neopentyl glycol, glycerin, pentaerythritol, trimethylolpropane). The dicarboxylic acids are used in a quantity variable from 10 to 100% (normally from 20 to 80%), and the alcohols in equimolar quantity or slight excess (for example 5%). Difunctional acids of succinic, adipic, azelaic, sebacic, phthalic, orthophthalic, isophthalic or hexahydrophthalic acid type or the corresponding anhydrides can be used in combination with the aforesaid compounds. These acids have the characteristic of not containing reactive ethylenic groups, and are inserted into the structure to modify the physical-chemical properties of the film obtained. The polyesters are generally mixed with vinyl and/or acrylic reactive diluents of the type described hereinafter, in order to obtain a suitable viscosity for use.
2. Epoxy resins with vinyl and/or acrylic functionalization. These resins are condensation products of 2,2-bis-(4,4'-phenol propane) (commonly known as bisphenol A), 1-chloro-2,3-epoxy propane (epichlorohydrin) and acrylic acid. Various components in addition to this structure can be used to modify the physical-chemical characteristics of the resin. Polyfunctional acids such as adipic, succinic or azelaic acid are for example added for this purpose. To achieve the appropriate viscosity for their use, these epoxy resins are mixed with vinyl or acrylic reactive diluents.
3. Polyurethane resins with vinyl and/or acrylic functionalization. These resins are obtained by reacting other hydroxylated molecules with diisocyanates and particular molecules having an unsaturated functionality and a hydroxyl functionality. The polyols used can comprise the following compounds: polyethylene and polypropylene glycols of different molecular weight, diols of neopentyl glycol or hydroxypivalic type, triols such as trimethylolethane or propane, or glycerol; hydroxylated low molecular weight polyester resins, polyesteramides obtained by adding cyclic ketones to diols. The most frequently used isocyanates contain two —NCO groups per molecule and include 2,4-2,6-toluenediisocyanate, 1,6-4,4'-diphenylmethanediisocyanate, 4,4'-dicyclohexylmethane diisocyanate, 1,6-hexamethylenediisocyanate, 4,4'-dicyclohexylmethane diisocyanate, 1,6-hexamethylene diisocyanate, isophorone diisocyanate, 2,2,4-trimethylhexane -1,6-diisocyanate. The reactive functionality of ethylenic unsaturated type is introduced by hydroxylated unsaturated molecules, the unsaturation being of hydroxyethyl acrylate, 2-hydroxypropyl acrylate, 4-hydroxybutyl acrylate or corresponding methacrylic derivative type. In the case of vinyl unsaturation, hydroxylated molecules such as 4-hydroxybutyl vinylether are used. These resins are particularly important in that by virtue of the particular structure of the bonds present (urethanic) they give the coating film superior elasticity and hardness.

Compounds can be conveniently added to these resins to improve their physical-chemical characteristics, and in particular:

a) Acrylic esters of different viscosity and functionality. These molecules perform a double function when included in the composition of a product curable by ionizing radiation. In this respect they serve both to give the basic resin those characteristics enabling a coating film to be obtained having the desired final properties, and as reactive diluents used to adjust the product to a suitable viscosity for application. In general, they can be acrylic or methacrylic esters or amides, or comonomers of these esters with other copolymerizable monomers. For example, linear chain alcohol esters of methacrylate, methylmethacrylate, ethylacrylate, butylacrylate or 2-ethylhexylacrylate type can be used. The possible amides include acrylamide, tert-butylacrylamide and primary alkylacrylamides. Molecules of other type can be used to obtain diluents of unsaturated functionality having the required characteristics, and in particular, itaconic esters; maleic esters; compounds containing alkyl groups; diol or triol acrylates and methacrylates such as 1,6-hexanediol, neopentyl glycol, 1,4-butanediol, trimethylolpropane, pentaerythritol, acrylates of oxyethylene and oxypropylene derivatives of various degrees of compensation and molecular weight, low molecular weight polyester acrylates obtained by condensing dicarboxylic acids and polyols (for example, adipic acid, azelaic acid, phthalic acids and corresponding anhydrides with ethylene or propylene glycols of various molecular weights, or saturated alkylene diols such as 1,6-hexanediol, trimethylolpropane).

b) Compounds containing vinyl groups. These are used mainly as "reactive diluents", their purpose being to adjust the coating to the desired application viscosity. Examples of such compounds are: vinylacetate, styrene, vinyltoluene, divinylbenzene, methylvinylether, ethylvinylether, butylvinylether, tripropyleneglycol divinylether, diethyleneglycol divinylether, 1,4-butanediol divinylether, tetraethyleneglycol divinylether.

All the aforesaid types of compounds, curable by ionizing radiation, can be used in mixture with other materials to obtain a coating product suitable for the specific characteristics of the application. In particular, dyes, organic and inorganic pigments, and fillers such as talc, calcium carbonate, barium sulphate or kaolin can be added. Other additives can be used such as molecules of silicone structure, polyethylene waxes, light stabilizers and photosensitive compounds if curing induced by ultraviolet radiation is required (for example, compounds such as benzoin and its ethers, benzyl ketals, alpha-hydroxyketones, phosphine oxide derivatives).

The formulated final product is applied to the panel surface by conventional methods, using roller spreaders, automatic spray applicators or curtain coating machines, and is then subjected to ionizing radiation for curing. It should be noted that the term "ionizing radiation" means radiation of high energy and/or secondary energy resulting from the conversion of electrons or another energy source (X-rays or gamma rays). Various sources of such radiation can be used for this purpose provided that a minimum of 100,000 electron volts is exceeded. That which has been found most convenient from the cost and industrial viewpoint is of the type producing high energy electrons. The maximum limit which can be used in practice is about 20,000,000 electron volts. In general, increasing the energy results in increased penetration into the layer to be cured. The minimum limit is that which is sufficient to produce ions or to split chemical bonds of ethylene type.

The typical working conditions for industrial curing plant for coatings are between 150,000 electron volts and 500,000 electron volts.

The electrons are emitted by a metal filament raised to a very high temperature and are then accelerated in a high vacuum chamber from which the electrons emerge via a thin metal sheet to strike the surface coated with the coating sensitive to this type of radiation. The energy quantity to be supplied for complete curing of the coating layer applied to the panel is generally within a range of between 2 and 200 kGy ( as is well known, 1 Gy=1 Gray=1 J/kg and is the energy supplied per mass of product). Curing of the coating takes place in a controlled gas atmosphere to enable the film surface characteristics to be regulated, and in particular its rubbing resistance and gloss. Typically, the working conditions to achieve complete curing of the coating require the oxygen concentration to be lowered to below about 5000 parts per million to prevent oxidative inhibition by oxygen molecules.

Much industrial equipment is available for implementing the aforesaid curing process. Equipment of this type is produced for example by Polymer Physyk of Tubingen, Germany, by Energy Science International of Wilmington, Mass., U.S.A., and by RPC Industries, Hayward, Calif., U.S.A.

If surfaces with particular effects are to be obtained, such as surfaces of high opacity or very high resistance to surface rubbing, special already known curing processes can be used, such as that described in U.S. Pat. No. 3,918,393, in which electron beam curing is combined with curing induced by ultraviolet radiation (with a wavelength variable within a range of 1800–4000 Angstrom. In this case, the coating also contains a photo-sensitive compound able to produce radicals able to trigger the reaction of the ethylenic double bond.

It should be noted that the coatings used in the process are solvent-free and do not emit harmful substances during their working and curing.

BRIEF DESCRIPTION OF THE DRAWINGS

FIGS. 1–5 each illustrate a partial cross-sectional view through a rounded-end panel during one of the various stages of implementation of the postforming enhancement procedure to which panels in accordance with the invention may be subjected to.

FIGS. 6–14 each illustrate a partial cross-sectional views through a panel during one of the various stages of implementation of the preforming enhancement procedure to which panels in accordance with the invention may be subjected to.

DESCRIPTION OF THE PREFERRED EMBODIMENT

Figure 1:
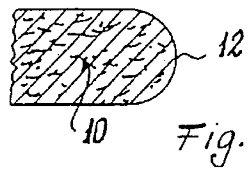
Figure 3:
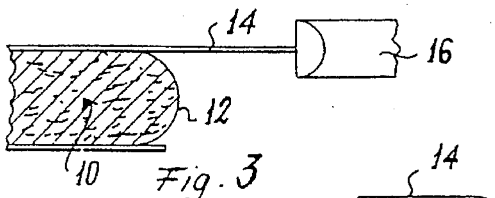
Figure 5:
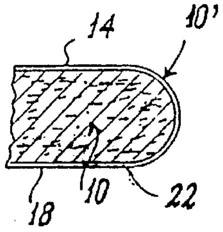
Figure 2:
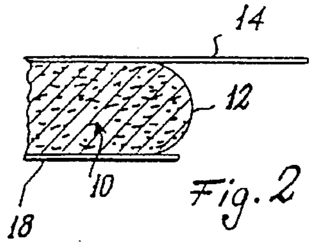
Figure 4:
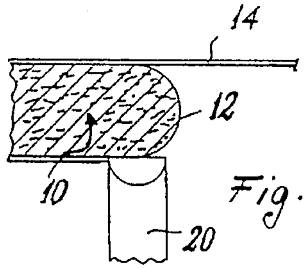

The invention will be more apparent from the description of one embodiment thereof given hereinafter by way of non-limiting example.

A panel (the so-called "support") is of wood-based chipboard or fiberboard (MDF). The panel can originate directly from its production presses or can be first cut into bars or elements of the required dimensions, which can be used as such (untreated) or can be semi-processed, for example by covering their two faces with Kraft paper to make their surfaces uniform, and/or with a decorative paper to obtain special effects (wooden, marble or pearlescent appearance).

In the case of an untreated panel, a preparation stage is required depending on its degree of uniformity (as is well known, production tolerances are some tenths of a millimeter) and consisting of smoothing by abrasive machines of roller or pad type.

If covered with paper, smoothing is not normally necessary, a light roller being merely passed over the paper-covered panel to facilitate penetration of the coating.

The panel prepared in this manner is then filled to an extent depending on the degree of porosity (the so-called quality) of its surface. In the case of an untreated panel, liquid fillers of high viscosity (between 5000 and 50,000 mPa.s) are applied by roller machines. These fillers must have high reactivity and can also be cured by ionizing radiation or ultraviolet radiation, the choice depending on how the production line has been designed and the required production rate. For this purpose, resins of unsaturated polyester, epoxyacrylic or acrylic ester type are used in a variable thickness corresponding to 10–80 g/m$^2$ of covered surface.

In the case of a panel covered with decorative paper, a filler of reactivity similar to the preceding is applied in the same thickness, but having a different degree of filling and transparency in order to preserve the decorative appearance provided by the paper. In both cases, the filler is then smoothed with abrasive paper using machines of roller or pad type to eliminate any irregularities deriving from the application of the filler. This treatment can be effected directly at the exit of the filler curing tunnel because of the instantaneous reaction of the filler film on treatment with radiation.

If quality requirements make it necessary, a second layer of filler is applied by roller or curtain machines in a thickness variable from 50 to 150 g/m$^2$. These fillers are also curable by radiation. Smoothing then follows to eliminate any microdefects.

Returning to the case of the untreated panel, depending on the aesthetic and quality requirements for the finished product a layer of colored finishing coating is then applied by roller or curtain machines. The thickness-applied can vary within the range of about 50–250 g/m$^2$. Conveniently, the coating contains the quantity of coloring substance (pigment) necessary to ensure complete covering of the substrate in one application. The coating composition varies on the basis of the required technical and applicational parameters, but will in any event be based on unsaturated resins curable by ionizing radiation, in particular unsaturated polyester, epoxyacrylate, polyurethane acrylate and acrylic ester resins of various kinds. This composition can vary on the basis of the quantity of coloring substance present, the thickness of the applied film, and the treatment undergone by the panel during the stages prior to its finishing, in order to ensure best results during the aforedescribed subsequent preforming or direct postforming for forming the ends.

In the case of a panel with decorative paper, the only difference is that the coating used is transparent to maintain the decorative appearance provided by the paper.

The coating is then cured by ionizing radiation (so-called electron beam curing), enabling the coating film to be cured in a single pass without limitations on the content of colorant substances present, these instead acting as a filter against other lesser energy types of radiation (such as ultraviolet). The thickness of the applied coating does not influence the reaction rate, and the very high degree of crosslinkage obtainable enables resins to be used which result in a covering layer of very elastic structure, enabling excellent results to be achieved by the preforming or direct postforming process. The curing conditions vary according to the coating used and the desired appearance, but fall within the aforesaid range.

As already stated, electron beam curing can be combined with curing by heating and/or by ultraviolet rays, to obtain special surface effects. In all cases, it is however the electron beam curing which is responsible for the complete curing of the coating.

Figure 10:
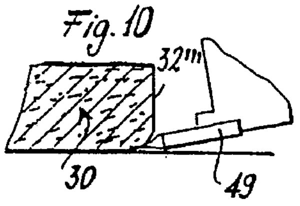
Figure 11:
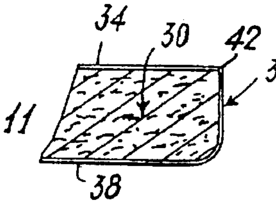
Figure 13:
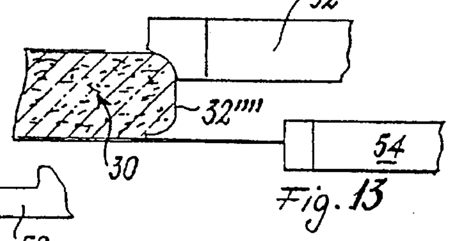
Figure 14:
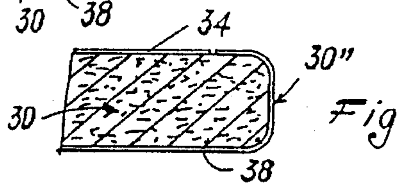

The final stage of the method, namely preforming or direct postforming, enables a panel to be obtained which is also coated on its machined (rounded or chamfered) ends. The intrinsic elasticity of the panel covering layer obtained in the aforedescribed manner enables the working cycle to be executed very rapidly, aided by the high temperature used in the stage shown in FIGS. 10, 11 or 13, 14, in which the projecting coating layer is curved and Glued against the machined end of the panel.

The finished product obtained in this manner has no surface defects (cracks or color variations in its covering film). Ends can also be obtained with 90° C. and 180° C. roundings.

In conclusion, some specific examples are described for completeness. It is to be understood that in the ensuing examples the starting panel could also be coated on only one of its two sides.

EXAMPLE 1

A starting support is a chipboard panel of 18 (±0.1) mm thickness with a density of 640 (±5) kg/m$^3$. The panel is smoothed with abrasive paper of aluminum oxide powder (180 grain) type. A filler is applied by a roller machine in a quantity of 60 (±5) g/m$^2$, composed of the following resins (approximate % by weight): epoxyacrylate from bisphenol A/epichlorohydrin/acrylic acid 15%, tripropyleneglycol acrylic ester 40%, kaolin 15%, talc 22%, benzyldimethylketal 3%, benzophenone 2%, methyldiethanolamine 3%. The viscosity is about 30,000 mPa.s (25° C.).

The product is dried in a tunnel by ultraviolet emission using mercury lamps of about 120 W/cm power, with about 200 mJ/cm$^2$ radiation. The panel is smoothed with abrasive paper of aluminum oxide powder (220–380 grain) type and a second layer of the same filler is applied under the same conditions, which is then smoothed.

Using a curtain coating machine, a layer of finishing coating is then applied in a quantity of about 120 $g/m^2$ and having the following approximate composition (% by weight): polyester resin from phthalic anhydride/dipropylene glycol/acrylic acid 30%, acrylated urethane resin from isophorone diisocyanate/1,6-hexanediol/hydroxyethyl acrylate 15%, tripropyleneglycol acrylic ester 30%, titanium dioxide 24%, dimethylpolysiloxane 1%.

Curing is performed with an ESI Electro Curtain (R) electron beam curing plant in an inert gas ($N_2$) atmosphere with a dose of about 50 kGy and about 250,000 electron volts of accelerating power.

The following parameters are measured: specular gloss (ASTM D0523-67 test)=90% (±5), rubbing resistance (Hoffman test)=about 300 g.

Figure 6:
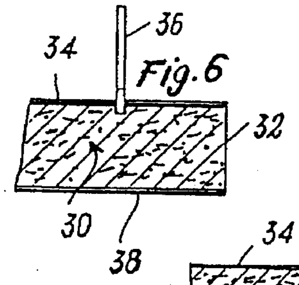
Figure 8:
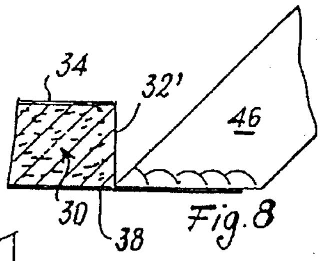
Figure 7:
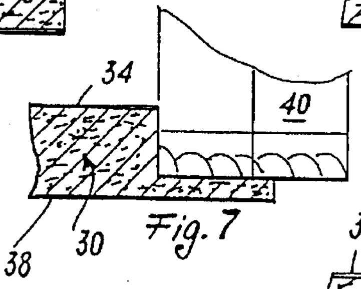
Figure 9:
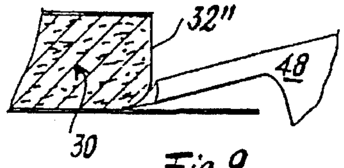
Figure 12:
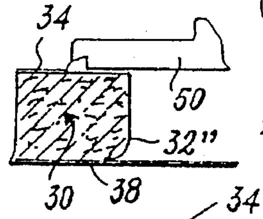

The panel is then cut into 60 cm×120 cm longitudinal bars and each bar is postformed (i.e., subjected to the afore-described preforming or direct postforming process shown in FIGS. 6–14) by an automatic machine at a rate of 20 m/minute and a heating lamp temperature of about 220° C., to obtain 90° and 180° curved ends.

The coating film has no breakages or microcracking and maintains the same gloss as the part which has not undergone the treatment.

EXAMPLE 2

A starting support is an MDF panel of 18 mm thickness with a density of 770 (±10) $kg/m^3$. The panel is smoothed with 180 grain abrasive paper of the same composition as that of the preceding example. A filler is applied by a roller machine in a quantity of 60 (±+) $g/m^2$. The composition of the filler is the same as that of the preceding example, but its application viscosity is adjusted to about 5000 mPa. s (25° C.) with a reactive diluent of dipropyleneglycol acrylic ester type. Smoothing is then carried out with 220–380 grain abrasive paper. A curtain coating machine is then used to apply a finishing coating in a quantity of 120 (±5) $g/m^2$ of the same composition as that of Example 1. The curing conditions are also the same as in the preceding case.

The following parameters are measured: specular gloss=95% (±3), rubbing resistance=about 300 g.

The panel was then cut and postformed by the same method as Example 1. No alterations, cracking or discoloration of the covering film were observed.

EXAMPLE 3

A starting support is a chipboard panel of 18 (±0.1) mm thickness with a density of 640 (±5) $kg/m^3$ on which Kraft paper was glued to provide a uniform surface plus further decorative paper printed for example with a pattern reproducing a wood, for example walnut.

The panel is treated with a filler applied by a roller machine in a quantity of 30 $g/m^2$ to seal its surface. This filler has the following composition (approximate % by weight): acrylated polyester resin from adipic acid/phthalic anhydride/dipropylene glycol/acrylic acid 40%, tripropyleneglycol acrylic ester 47%, talc 5%, benzyldimethylketal 3%, benzophenone 2%, methyl diethylamine 3%. The resultant viscosity is about 3000 mPa.s (25° C.). The filler was dried in a tunnel by ultraviolet emission using mercury lamps of about 120 W/cm power, with about 50 $mJ/cm^2$ radiation to achieve partial curing of the product. A curtain coating machine is then used to apply a quantity of 120 (±5) $g/m^2$ of a levelling filler having the same composition as the preceding but adjusted to a viscosity of about 200 mPa.s (25° C.) with a reactive diluent of dipropyleneglycol acrylic ester type.

Drying is by ultraviolet mercury vapor lamps of 120 W/cm power with 250 $mJ/cm^2$ radiation. At the tunnel exit, the product is smoothed with 220–380 grain abrasive paper of the aforesaid type to achieve a uniform surface. Using a curtain coating machine, a layer of finishing coating is then applied in a quantity of 120 (±5) $g/m^2$ and having the following composition (approximate % by weight): polyester resin from phthalic anhydride/dipropylene glycol/acrylic acid 35%, acrylated urethane resin from isophorone diisocyanate/1,6-hexane diol/hydroxyethyl acrylate 20%, tripropyleneglycol acrylic ester 44%, dimethylpolysiloxane 1%. Curing is performed with an electron beam curing plant in an inert gas ($N_2$) atmosphere with a dose of about 50 kGy and about 250,000 electron volts of accelerating power.

The resultant properties are as follows: specular gloss=95% (±3), rubbing resistance=about 300 g.

The panel was then cut into longitudinal bars and each bar is postformed by an automatic machine as already described, to obtain 90° and 180° curved ends. The coating film has no breakages or microcracking and maintains the same gloss as the part which has not undergone the postforming treatment.

The examples provided above are not meant to be exclusive. Many other variations of the present invention would be obvious to those skilled in the art, and are contemplated to be within the scope of the appended claims.

I claim:

1. Method for industrially producing a coated wood-based panel with at least one rounded edge from a two-sided starting panel of fiberboard or chipboard, comprising the steps of:

applying at least one coating formed from a base of at least one unsaturated resin of a type curable by ionizing radiation to said two sides of said starting panel, curing said coating by ionizing radiation, and mechanically bending said cured coating to conform to and overlie said t least one rounded edge of said starting panel.

2. The method of claim 1, wherein said unsaturated resins are selected from the group consisting of acrylic unsaturated resins, methacrylic unsaturated resins, vinyl type unsaturated reins and mixtures thereof.

3. The method of claim 1, wherein said unsaturated resins are selected from the group consisting of polyester type unsaturated resins dissolved in vinyl monomers, polyester type unsaturated resins dissolved in acrylic monomers, epoxy type unsaturated resins with vinyl functionalization, polyurethane type unsaturated resins with vinyl functionalization, epoxy type unsaturated resins with acrylic functionalization, polyurethane type unsaturated resins with acrylic functionalization, and mixtures thereof.

4. The method of claim 1, further comprising the step of adding acrylic esters having different viscosities and functionalities to said unsaturated resins.

5. The method of claim 1, further comprising the step of adding acrylic esters having different viscosities and functionalities and molecules containing vinyl groups to said unsaturated resins.

6. The method of claim 1, further comprising the step of adding acrylic esters having molecules containing vinyl groups to said unsaturated resins.

7. The method of claim 1, wherein the ionizing radiation supplies a quantity of energy to said at least one coating in a range of from about 2 to about 200 kCy and has an acceleration voltage between about 100,000 and about 20,000,000 electron volts.

8. The method of claim 1, further comprising the step of adding photosensitive compounds to said at least one coating to produce radicals capable of triggering the reaction of an ethylenic double bond.

9. A coated wood-based panel with at least one rounded edge, comprising a fiberboard or chipboard panel having two sides and at least one rounded edge, and at least one coating arranged on said two sides of said panel and said at least one rounded edge, said at least one coating being formed from a base of at least one unsaturated resin which is cured by ionizing radiation.

10. The panel of claim 9, wherein said at least one coating comprises photosensitive compounds for producing radicals capable of triggering the reaction of an ethylenic double bond.

11. The panel of claim 9, wherein said unsaturated resins are selected from the group consisting of acrylic unsaturated resins, methacrylic unsaturated resins, vinyl type unsaturated reins and mixtures thereof.

12. The panel of claim 9, wherein said unsaturated resins are selected from the group consisting of polyester type unsaturated resins dissolved in vinyl monomers, polyester type unsaturated resins dissolved in acrylic monomers, epoxy type unsaturated resins with vinyl functionalization, polyurethane type unsaturated resins with vinyl functionalization, epoxy type unsaturated resins with acrylic functionalization, polyurethane type unsaturated resins with acrylic functionalization, and mixtures thereof.

13. The panel of claim 9, wherein said unsaturated resins include acrylic esters having different viscosities and functionalities.

14. The panel of claim 9, wherein said unsaturated resins include acrylic esters having different viscosities and functionalities and molecules containing vinyl groups.

15. The panel of claim 9, wherein said unsaturated resins include acrylic esters having molecules containing vinyl groups.

16. A coated wood-based panel with at least one rounded edge produced by forming a starting panel from chipboard of fiberboard having two sides, coating said two sides of said starting panel by applying at least one coating of a type curable by ionizing radiation to said two sides of said starting panel, forming said at least one coating from a base of at least one unsaturated resin, curing said coating by ionizing radiation, forming at least one rounded edge in said starting panel, and mechanically bending said cured coating to conform to and overlie said at least one rounded edge of said starting panel.

* * * * *

UNITED STATES PATENT AND TRADEMARK OFFICE

CERTIFICATE OF CORRECTION

PATENT NO. : 5,573,832

DATED : November 12, 1996

INVENTOR(S) : Dante Frati

It is certified that error appears in the above-indentified patent and that said Letters Patent is hereby corrected as shown below:

Cover page, after " [73] Assignee: Bipan", change "S.E.A." to --S.P.A.--.

Signed and Sealed this

Twenty-eighth Day of January, 1997

Attest:

BRUCE LEHMAN

*Attesting Officer* *Commissioner of Patents and Trademarks*